US011700205B2

(12) United States Patent
Sufleta et al.

(10) Patent No.: US 11,700,205 B2
(45) Date of Patent: Jul. 11, 2023

(54) OPTIMAL CONTROL OF NETWORK TRAFFIC VISIBILITY RESOURCES AND DISTRIBUTED TRAFFIC PROCESSING RESOURCE CONTROL SYSTEM

(71) Applicant: Gigamon Inc., Santa Clara, CA (US)

(72) Inventors: Zbigniew Sufleta, San Francisco, CA (US); Nitin Saxena, Pleasanton, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 17/393,359

(22) Filed: Aug. 3, 2021

(65) Prior Publication Data

US 2022/0045954 A1   Feb. 10, 2022

Related U.S. Application Data

(60) Provisional application No. 63/065,151, filed on Aug. 13, 2020, provisional application No. 63/060,901, filed on Aug. 4, 2020.

(51) Int. Cl.
| | |
|---|---|
| G06F 15/173 | (2006.01) |
| H04L 47/125 | (2022.01) |
| H04L 43/022 | (2022.01) |
| H04L 43/16 | (2022.01) |
| H04L 43/0876 | (2022.01) |

(52) U.S. Cl.
CPC .......... H04L 47/125 (2013.01); H04L 43/022 (2013.01); H04L 43/0876 (2013.01); H04L 43/16 (2013.01)

(58) Field of Classification Search
None
See application file for complete search history.

(56) References Cited

U.S. PATENT DOCUMENTS

| | | | | |
|---|---|---|---|---|
| 8,346,909 B2 * | 1/2013 | Dan | ........................ | H04L 67/62 |
| | | | | 709/224 |
| 8,782,120 B2 * | 7/2014 | Jackson | .............. | H04L 67/1001 |
| | | | | 709/202 |

(Continued)

OTHER PUBLICATIONS

Search Report and Written Opinion for International Application No. PCT/US2021/044413, filed Aug. 3, 2021.

*Primary Examiner* — Phuoc H Nguyen
(74) *Attorney, Agent, or Firm* — Perkins Coie LLP

(57) ABSTRACT

A method of optimizing network traffic visibility resources comprises receiving, by a controller associated with a network traffic visibility system, information indicative of operation of the network traffic visibility system. The method further comprises facilitating, by the controller, control of resources in the network traffic visibility system, according to a configured resource control policy. The facilitating can include providing, by the controller, control signaling to cause maximization of network traffic monitoring fidelity for a plurality of Quality of Service (QoS) classes of network traffic, based on a specified fixed amount of one or more network resources associated with the network traffic visibility system. Alternatively or additionally, the facilitating can include providing, by the controller, control signaling to cause minimization of use of the one or more network resources, based on a specified fixed level of traffic monitoring fidelity associated with the plurality of QoS classes.

26 Claims, 11 Drawing Sheets

(56) References Cited

U.S. PATENT DOCUMENTS

| | | | | |
|---|---|---|---|---|
| 10,863,525 | B1* | 12/2020 | Vivanco | H04L 5/0053 |
| 11,341,131 | B2* | 5/2022 | Pal | G06F 16/1734 |
| 11,409,266 | B2* | 8/2022 | Celia | G06Q 10/0639 |
| 11,409,748 | B1* | 8/2022 | Gupta | G06F 16/334 |
| 2006/0039364 | A1 | 2/2006 | Wright | |
| 2009/0324232 | A1 | 12/2009 | So | |
| 2011/0080886 | A1 | 4/2011 | Chandrachood et al. | |
| 2013/0086273 | A1* | 4/2013 | Wray | G06F 9/5072 |
| | | | | 709/226 |
| 2014/0098671 | A1 | 4/2014 | Raleigh et al. | |
| 2014/0344425 | A1* | 11/2014 | Varney | H04L 41/509 |
| | | | | 709/221 |
| 2015/0334040 | A1* | 11/2015 | Crowell | H04L 12/6418 |
| | | | | 709/226 |
| 2016/0205174 | A1* | 7/2016 | Pitio | H04L 47/283 |
| | | | | 709/201 |
| 2017/0085628 | A1 | 3/2017 | Mahindra et al. | |
| 2022/0045954 | A1* | 2/2022 | Sufleta | H04L 43/022 |
| 2022/0086698 | A1* | 3/2022 | Yao | H04L 43/20 |

* cited by examiner

OPTIMAL CONTROL OF NETWORK TRAFFIC VISIBILITY RESOURCES AND DISTRIBUTED TRAFFIC PROCESSING RESOURCE CONTROL SYSTEM

This application claims the benefit of U.S. provisional patent application No. 63/060,901 filed on Aug. 4, 2020, and U.S. provisional patent application No. 63/065,151 filed on Aug. 13, 2020, each of which is incorporated by reference herein in its entirety.

TECHNICAL FIELD

This disclosure pertains to the field of network traffic monitoring (also called network traffic visibility), and more particularly, to techniques for control of network traffic visibility resources.

BACKGROUND

In a network traffic monitoring system (also called a network traffic visibility system herein), the traffic processing operations use resources, such as one or more central processing unit (CPUs or network processing unit (NPU) capacity, volatile and nonvolatile memory volumes, and ingress/egress bandwidth. The processing operations are defined through a traffic monitoring configuration and may involve steps such as packet filtering, packet deduplication, packet transformations such as slicing, masking, packet header stripping or adding, tracking packets' membership in network connections or sessions, tracking packets' membership in traffic flows associated with a specific user or host identifier, deriving metadata from packet content, classifying packets according to specific criteria in order to determine the sequence of steps to be performed on subsets of packets, and finally sending select packets or metadata to receivers.

In a hypothetical scenario that imposes no limits on the amount of the used traffic processing resources, any packet supplied for traffic processing operations defined by the traffic monitoring configuration is expected to be handled according to the configuration. However, in many real-life scenarios there is a limit on the amount of the processing resources that can be used. Therefore, some of the supplied packets may need to be omitted from some or all processing steps for the other packets to be processed in a meaningful way. The selective admission of packets to the traffic processing operation chain is called sampling. Sampling should be done carefully to preserve the integrity of connections, sessions, or other packet aggregates that need to be processed in a coordinated way rather than as individual packets. Also, not all packets are equally important for a given set of traffic processing objectives. Therefore, if a need for sampling arises then it may be desirable to impose different sampling ratios for different classes of packets. Some other real-life scenarios involve processing resources that are precious (costly to use), where it may be desirable to use as little of the resources as possible.

BRIEF DESCRIPTION OF THE DRAWINGS

Illustrative examples are described in detail below with reference to the following figures.

DETAILED DESCRIPTION

Figure 1:
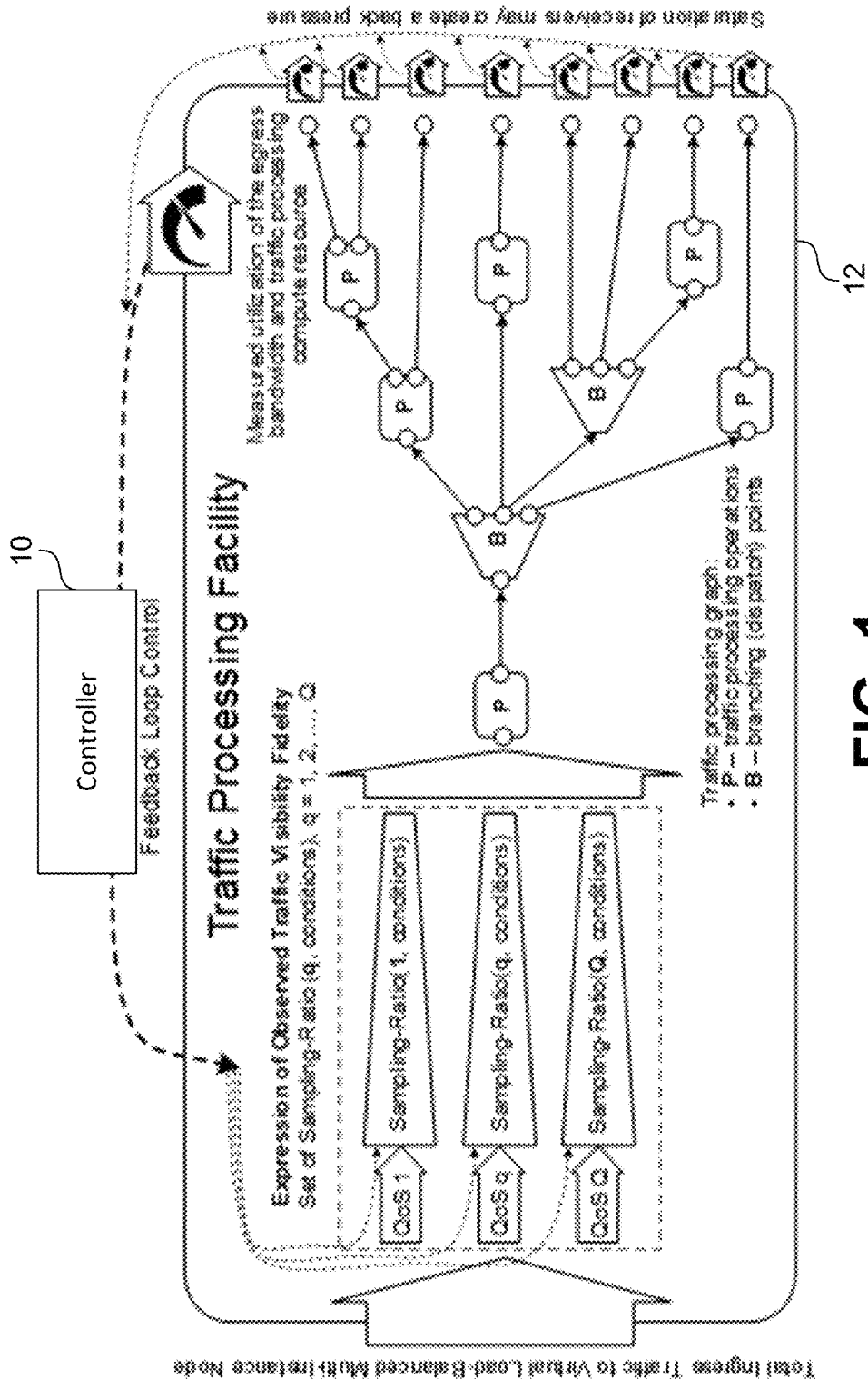
FIG. 1 illustrates of a method of maximizing traffic visibility fidelity for a fixed amount of traffic processing resources in a network traffic visibility system.

Introduced here are two related techniques: 1) Optimal Control of Network Traffic Visibility Resources, and 2) a Distributed Traffic Processing Resource Control System.

I. Optimal Control of Network Traffic Visibility Resources

A. Overview

Introduced here is a technique for optimizing network traffic visibility resources. In at least one embodiment the technique includes receiving, by a controller associated with a network traffic visibility system, information indicative of operation of the network traffic visibility system. The technique further comprises facilitating, by the controller, control of resources in the network traffic visibility system, according to a configured resource control policy. The facilitating can include providing, by the controller, control signaling to cause maximization of network traffic monitoring fidelity for a plurality of Quality of Service (QoS) classes of network traffic, based on a specified fixed amount of one or more network resources associated with the network traffic visibility system. Alternatively or additionally, the facilitating can include providing, by the controller, control signaling to cause minimization of use of the one or more network resources, based on a specified fixed level of traffic monitoring fidelity associated with the plurality of QoS classes.

In general, network traffic received by the network traffic visibility system will be sampled according to one or more sampling ratios, where each QoS class of network traffic has its own sampling ratio. In general, the term "traffic processing fidelity" can be defined as the degree to which the total amount of supplied traffic is processed according to the traffic processing configuration. Alternatively, "traffic processing fidelity" can be defined as the degree to which the performed processing meets the objectives of traffic monitoring or analysis. In the context of this description, however, the term "traffic processing fidelity" is more specifically defined as an aggregated measure of the sampling ratios required to meet the QoS objectives for a collection of QoS classes.

This invention addresses at least the following two types of network traffic processing scenarios:

1. In the first scenario the amount of processing resources is limited and, at least at times, is insufficient to handle the entire universe of supplied packets according to the established packet processing configuration and therefore the traffic processing must be rationed by sampling, i.e. controlling the traffic processing fidelity.

2. In the second scenario the processing resources are precious while there is a level of traffic sampling that is considered acceptable, i.e. the traffic processing fidelity is fixed. As used herein, the term "fixed" means that the thing modified by this term is set to, held at or specified to be at a particular level, at least for some arbitrary period of time (known or unknown). It does not mean, however, that the level can never be changed.

To strike a balance between the expenditure of resources and the fidelity of traffic processing, one may state the goal of the technique introduced here as optimal control of traffic processing. The optimization may take either of two forms:

1. Maximize the traffic processing fidelity within the fixed amount of resources.

2. Minimize the use of resources for the fixed level traffic processing fidelity As used herein, the terms "maximize" and "minimize" do not necessarily mean to achieve the highest or lowest level theoretically possible, respectively, under a given circumstance or under any circumstances; nor do they necessarily mean to achieve the highest or lowest level that is practically achievable in a given situation. Rather, in the context of this description, "maximize" and "minimize" mean to achieve the highest level and lowest level achievable, respectively, given one or more specified or implicit conditions and/or constraints, which may be implementation specific, and where the precise definitions of these terms also may be implementation specific.

It is also possible to employ a hybrid optimization model in which the goal is to minimize the use of resources for a fixed traffic processing fidelity for as long as the needed resources fall within certain boundaries (e.g., between a lower threshold and an upper threshold), while the goal becomes to maximize the traffic processing fidelity for a fixed amount of resources when the needed resources are outside such boundaries. The hybrid model serves well the scenarios with some resource availability elasticity but with the imposed upper and lower limits of such elasticity. The upper limit is typically related to the cost cap or just a fixed number of resource units. When operating at the highest available resource level, the only way to reconcile the traffic processing fidelity goals and the hard resource limit is by adjusting down the traffic processing fidelity. The lower limit is typically related to the resource allocation granularity, i.e., there is a certain size of the resource allocation unit, and therefore any unused portion of such a unit would be lost if the traffic rate is low and the traffic processing fidelity is not adjusted upward. The hybrid optimization model may also be useful for specifying policies for handling sudden spikes (bursts) of traffic without compromising the traffic processing fidelity.

Both the definition of QoS classes and the definition of what constitutes a subset of packets selected from an arbitrary set of packets of a given class for a given sampling ratio are the choice of the user of the traffic processing facility. These definitions are two parts of the overall user configuration for the traffic processing system. Other parts of the user configuration include the traffic processing configuration (i.e., the traffic processing operations and their parameters as well as the sequencing of such operations), the definition of traffic processing resources and the units of traffic processing resources amount, the choice between the three optimization models (maximization, minimization, or hybrid), the way of aggregating the sampling ratios of specific QoS classes into a single traffic processing fidelity figure, as well as the configuration parameters specific to the chosen optimization model.

For the maximization of the traffic processing fidelity within the fixed amount of resources, an additional configuration parameter is the maximum amount of processing resources available. If the egress bandwidth is also subject to the optimization, then another set of additional configuration parameters are the maximum levels of bandwidth for egress points.

For the minimization of the amount of resources for the fixed traffic processing fidelity, an additional configuration parameter is the minimum value of the aggregate traffic processing fidelity figure. In some cases, this value is, or equivalent to, the set of fixed sampling ratios for a collection of QoS classes.

For the hybrid model an additional configuration parameter (in addition to the parameters needed for the maximization and minimization models) is the minimum resource size that can be made available.

The techniques introduced here therefore involve a method of responding to fluctuations of traffic and the resulting fluctuations in resource utilization or observed sampling ratios in order to meet the requirements imposed by the user configuration. This method in at least some embodiments includes the following advantageous features:

1. A method of defining the traffic processing fidelity in actionable terms of QoS classes of traffic and sampling ratios for each QoS class as well as aggregate traffic processing fidelity figure.

2. A method of responding to fluctuations of traffic and the resulting fluctuations in resource utilization in order to meet the requirements imposed by the user configuration for the optimization model the objective of which is to maximize the traffic visibility fidelity for a fixed amount of traffic processing resources.

3. A method of responding to fluctuations of traffic and the resulting fluctuations in observed sampling ratios (for a set of QoS classes) in order to meet the requirements imposed by the user configuration for the optimization model the objective of which is to minimize the used traffic processing resources for the fixed level of the traffic fidelity.

4. A hybrid model.

5. A method of collecting and using traffic and resource/bandwidth utilization statistics for the purpose of supporting the feedback-loop control algorithms through estimates of relationships between traffic rate increments/decrements and the corresponding resource/bandwidth use increments/decrements.

The framework defined herein (including the five methods listed above section) is applicable to a range of traffic processing scenarios. The traffic processing entities can include out-of-band intrusion detection systems, network packet brokers, network traffic encryption and out-of-band decryption facilities, network traffic monitoring tools, network traffic metadata generators and analyzers, network traffic security threat detection facilities, mobility network monitoring functions, line-rate network traffic storage facilities, and many others. The framework may apply also to inline network traffic processing devices such as firewalls, intrusion prevention systems, or inline packet brokers if the traffic not included in processing can be guided through a bypass (i.e., around the traffic processing facility rather than through it). Note that many existing networking technologies widely use QoS and sampling concepts. However, it is believed that, unlike the techniques introduced here, they do not provide optimal control of traffic processing, where the QoS and sampling are just enablers. Also, one of the objectives of the technique introduced here is to establish a balance between the traffic processing fidelity and the use of resources/bandwidth in a way that facilitates the entire user requested configuration without having to drop packets because of insufficient resources. Many existing traffic processing facilities operating through conventional sampling and QoS categorization allow packet drops for the portion of the traffic that does not fit into the resource capacity. The alternative to the techniques introduced here, for optimizing the trade-off between traffic processing fidelity and the use of resources, is a wasteful use of resources or excluding parts of traffic from being processed according to the desired configuration.

B. Example Implementation Details

We will now further describe each of the methods stated in the previous section.

Method 1

Let us start from the construct of traffic processing fidelity, i.e. method 1 of the invention set. In general, a desired level of traffic processing fidelity can be expressed through a set of sampling ratios, each sampling ratio corresponding to a specific to QoS class: Sampling-Ratio(q, conditions), $q=1, 2, \ldots, Q$. By "conditions" we mean any aspects of the traffic processing facility state including the resource/bandwidth utilization, traffic rate, and other factors. As the rate of the traffic coming to the processing facility fluctuates, each of the sampling ratios will fluctuate as well given the processing resources are fixed. One may try to keep the sampling ratios fixed (or above certain thresholds) by adjusting the supply of processing resources.

In many scenarios the sampling ratios associated with specific to QoS classes are desired to be in a certain relationship to each other. For example, if the total sampling ratio for the entire traffic is S then one may try to keep Sampling-Ratio(q, conditions)=Weighting-Coefficient(q, conditions)*S, $q=1, 2, \ldots, Q$. It is rather common to see the coefficients Weighting-Coefficient(q, conditions), $q=1, 2, \ldots, Q$ constant, i.e., independent of "conditions," but in a general case such coefficients may be variable depending on some conditions. Regardless, Sampling-Ratio(q, conditions) value is a non-decreasing function of Q, $q=1, 2, \ldots, Q$ (i.e., the classes with higher QoS q demand higher sampling ratios.)

Method 2

FIG. 1 explains Method 2, which involves responding to fluctuations of traffic and the resulting fluctuations in resource utilization in order to meet the requirements imposed by the user configuration when the objective of the optimization model is to maximize the traffic visibility fidelity for a fixed amount of traffic processing resources. More specifically, FIG. 1 shows how the total load of ingress traffic enters the Traffic Processing Facility (TPF) 12 in a network traffic visibility system, and gets immediately classified to one of Q QoS classes. There are no restrictions on how the QoS classes are defined as long as there is a well-defined algorithmic way of determining which received packets belong to which of the Q QoS classes. The traffic assigned to a QoS class is then subjected to the sampling procedure that uses the sampling ratio determined by a resource control mechanism (hereinafter controller or "resource controller) 10 to be the best in terms of fully utilizing the fixed level of resources. Theoretically, such sampling ratios could correspond to the resource utilization of 100%, although any practical implementation would likely shape the sampling ratios to keep the measured utilization a bit below 100% (at a safe distance that accommodates the fluctuations of the resource utilization between the moments of time at which the utilization measurement is taken and a decision about sampling ratios adjustments are made and applied.)

The sampled traffic is then subjected to the processing defined by the user configuration. In FIG. 1, the traffic processing scheme is expressed by a directional acyclical graph that involves branching nodes and processing nodes. The graph representation is just one possible way of defining the traffic processing sequence and details. The traffic that passes through the system represented by the processing graph gets directed to one or more egress points that lead to packet or metadata receivers. Such egress points may expose limited absorption capacity that, in addition to the utilization of the processing resources, may affect the utilization figure that drives the sampling ratios for QoS classes. That is, saturation of data traffic receivers associated with the egress points may create backpressure.

Note that the combination of QoS class definitions and sampling ratio controls may be used for exposing certain portions of the received traffic to more or less processing operations in order to mitigate the limited processing resources. One example is using some of the QoS criteria as a basis for branching the flow of operations in the traffic processing graph. That way certain operations are performed only for traffic of higher QoS level. Another example is to have the traffic of certain QoS classes go through a branching point dividing the traffic processing into a fixed or controllable fraction of the traffic that goes through additional operations not performed for the remaining portion of the traffic. The fraction size could be one of the parameters subject to manipulation aimed at the maximizing the traffic processing fidelity.

The notion of resource utilization is meant in a broad way. It is generally assumed that the available resources are supplied in an elastic way, i.e., at a given point of time a certain number of processing capacity units (e.g., number of virtual machines or a percentage of clock cycles of a virtual Central Processing Unit) is made available for processing the incoming traffic and a specific ratio of this number is actually consumed by the processing. The utilization that drives the sampling ratios, however, is relative to the maximum amount of available resources.

The technique introduced here does not mandate a particular way of facilitating the feedback-control loop that takes the current observed level of resource utilization and imposes the respective sampling ratios for QoS classes. The location of the controller 10 (whether inside or outside the TPF), the frequency or obtaining the utilization measurements and executing sampling ratios adjustments, and the granularity of the relationship between the utilization levels and sampling ratio levels all can vary by implementation. A key aspect of the feedback-loop control, however, is that the controller 10 responds to an increase of resource utilization by reducing the sampling ratios, and vice versa. The imposed increments or decrements of sampling ratios are generally in some relationship to the measured decrements or increments of the resource utilization. More specific forms of such relationship are discussed below in relation to Method 5.

Method 3

Figure 2:
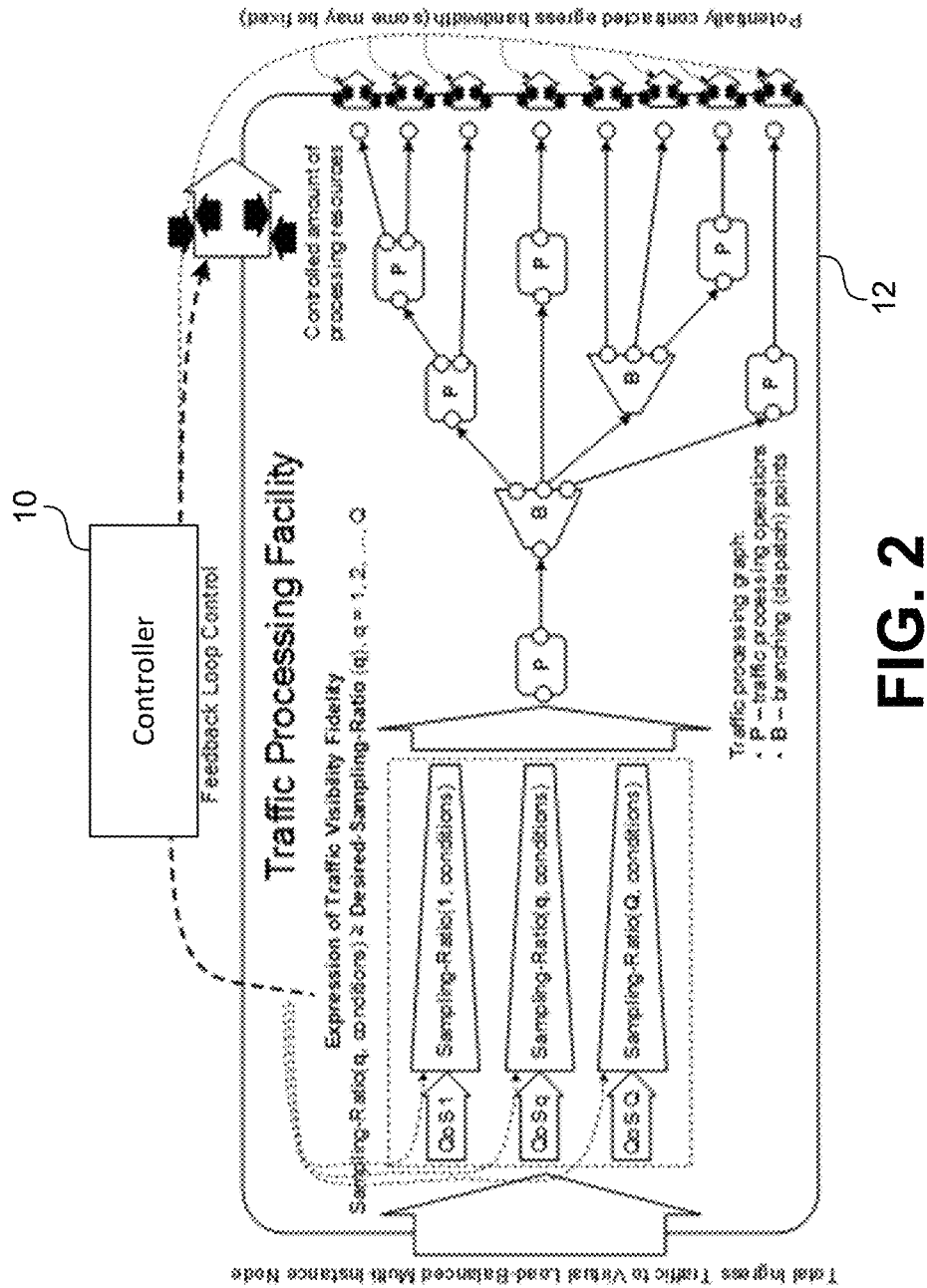
FIG. 2 illustrates of a method of minimizing usage of processing resources for a fixed traffic visibility fidelity level in a network traffic visibility system

FIG. 2 explains Method 3. In Method 3, the way of admitting traffic, classifying it to QoS classes, and applying sampling ratios is the same as for Method 2. However, in Method 3 the desired sampling ratios are constant while the levels of resources are subject to minimization. The fluctuations of traffic rate causes (with fixed sampling ratios) the resource utilization to go up or down. The controller 10 responds to such fluctuations (as needed) by expanding or shrinking the allocation of resources. This may happen in some units of resource granularity. There may be a utilization threshold crossing which triggers either expanding or shrinking of the allocated resources.

Method 4

Method 4 is essentially a combination of Methods 2 and 3. As mentioned earlier, the resources available may have an upper bound and a lower bound. Between the bounds it makes sense to minimize the use of resources for fixed sampling ratios. At the upper or lower bounds it makes sense to maximize the sampling ratios for a fixed resource level.

Method 5

Method 5 provides way of facilitating the feedback-loop control for Method 2. The essence of this method is to determine a statistical prediction of the ratio Δ=(increment of resource use)/(increment of traffic rate) for a given tuple (resource use, traffic rate, sampling ratio). The ratio Δ (a set of such ratios for a collection of QoS classes) can be used in order to calculate a sampling ratio adjustment for a given fluctuation amount of the resource use. The proposed approach is to record the tuples (traffic rate, set of sampling ratios, resource use) measured every time the control entity measures the resource utilization and determines the needed adjustments to the sampling ratios. Such tuples may be also time stamped in order to assign a significance of a specific tuple for obtaining the Δ predictions (older tuples have less significance than newer tuples). Whenever the control entity faces a need for a new Δ, it finds N tuples closest to the currently observed tuple and calculates the Δ value.

We have (adjusted total sampling ratio S)=(adjusted resource use)/(A*(traffic rate)). For the case of Sampling-Ratio(q, conditions)=Weighting-Coefficient(q)*S, q=1, 2, . . . , Q, we have (adjusted total sampling ratio Sampling-Ratio(q))=(adjusted total sampling ratio S)*Weighting-Coefficient(q)*S, q=1, 2, . . . , Q.

Figure 10:
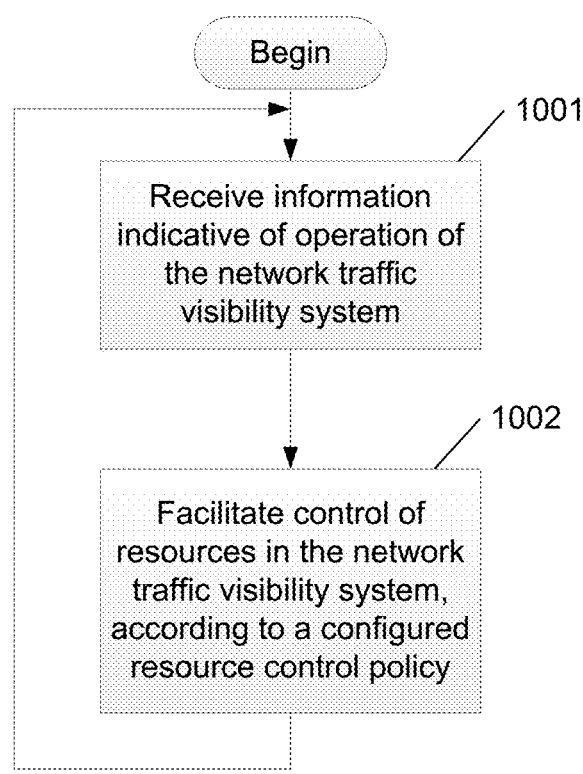
FIG. 10 is a flow diagram illustrating an example a technique for facilitating optimal control of traffic visibility resources, at a high level.

FIG. 10 illustrates an example the technique introduced above, at a high level. At a high level the technique can be summarized as repeating two-step process performed in the network traffic visibility system, where the first step 1001 includes receiving, by a controller associated with the network traffic visibility system, information indicative of operation of the network traffic visibility system. The second step, 1102, includes facilitating, by the controller, control of resources in the network traffic visibility system, according to a configured resource control policy. This sequence can repeat indefinitely, either in response to the receipt of new network traffic or according to some defined periodicity or schedule.

Figure 11:
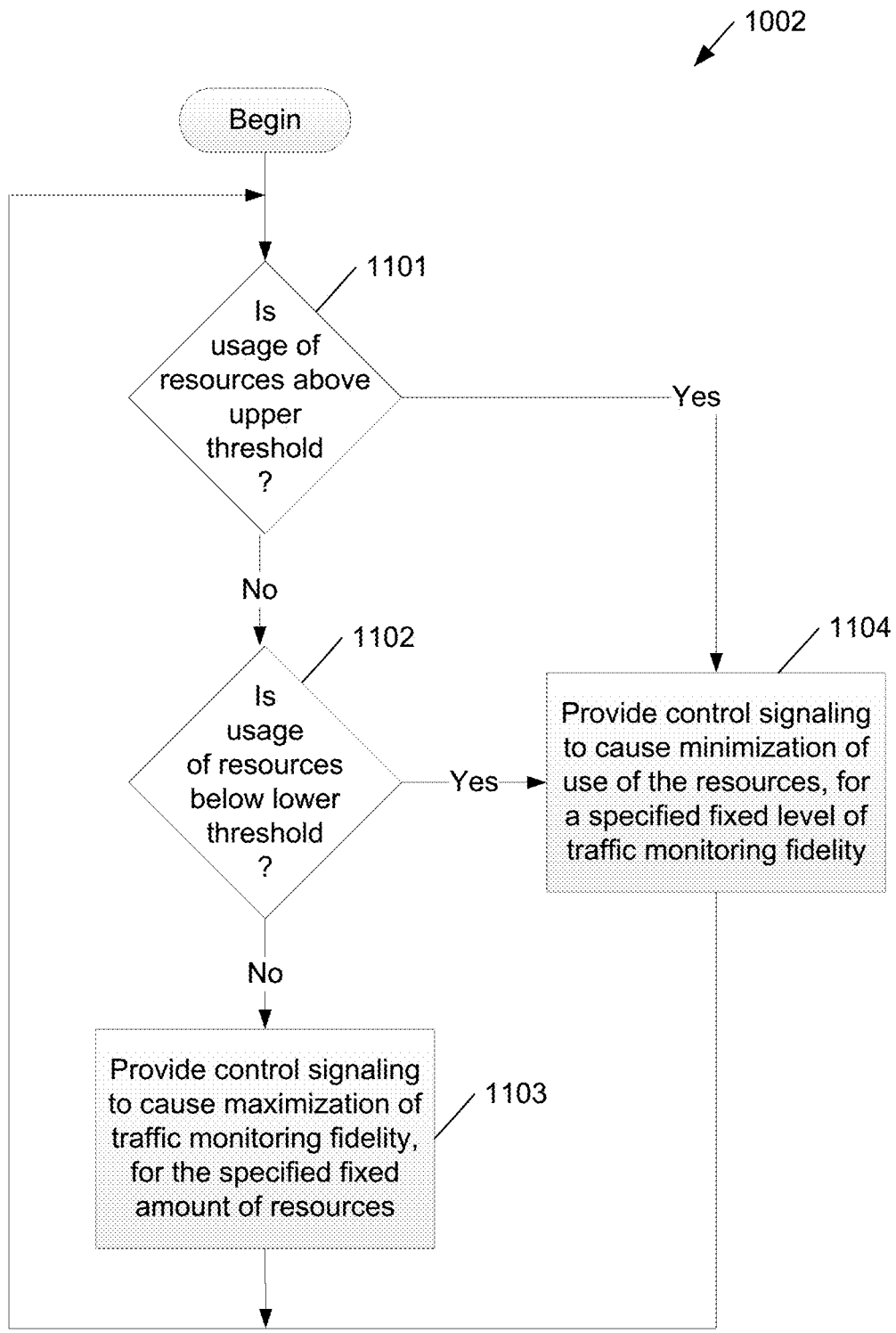
FIG. 11 is a flow diagram showing a more specific example of the technique in FIG. 10.

FIG. 11 shows an example of the second step 1002, according to at least one embodiment, i.e., the step of facilitating control of resources in the network traffic visibility system, according to a configured resource control policy. In this example, the process of step 1002 begins with step 1101, in which the controller determines whether usage of resources in the network traffic visibility system (e.g., memory usage, CPU processing capacity, and/or communication bandwidth) exceeds some specified upper threshold. If the answer is yes, then the process proceeds to step 1104, in which the controller provides control signaling (e.g., to one or more TPFs, taps and/or aggregators) to cause minimization of use of those resources, for a specified fixed level of traffic monitoring fidelity. The process then loops back to step 1101. If the answer to the determination in step 1101 is no, then from step 1101 the process proceeds to step 1102, in which the controller determines whether usage of resources in the network traffic visibility system falls below some specified lower threshold. If the answer to this determination is yes, then then the process proceeds to step 1104 as described above, and then loops back to step 1101. If the answer to both steps 1101 and 1102 is no, then from step 1102 the process proceeds to step 1103, in which the controller provides control signaling (e.g., to one or more taps and/or aggregators and/or TPFs) to cause maximization of traffic monitoring fidelity, for a specified fixed amount of resources in the network traffic visibility system. The process then loops back to step 1101.

II. Distributed Traffic Processing Resource Control System

A. Overview

The technique now described here further addresses the task of controlling the traffic processing resources by considering it for a complex system that involves multiple traffic processing resources facilities (TPFs) in a virtualized environment. An example system (one of many possible example systems) that serves as a reference for describing the main principles of the technique is presented in FIG. 3.

Figure 3:
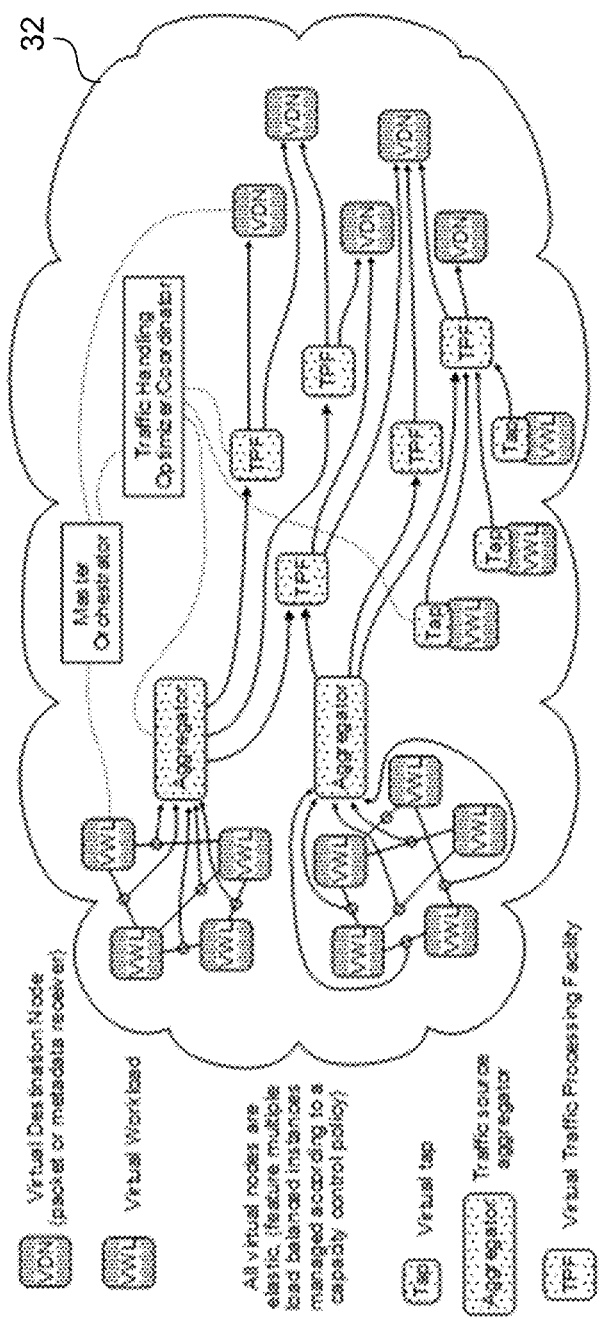
FIG. 3 shows an example distributed traffic processing resource control system.

In the system of FIG. 3, the Traffic Processing Facility (TPF) nodes (or simply "TPFs") each can be an instance of the TPF 12 discussed above under the heading, "Optimal Control of Network Traffic Visibility Resources." At any point of time a TPF such as shown in FIG. 3 operates optimally by imposing a set of traffic sampling ratios, each sampling ratio corresponding to a specific QoS class. The TPFs in the traffic processing network 32 are fed with the traffic coming from two kinds of other traffic processing nodes: taps and aggregators. The example of FIG. 3 uses the cloud network scenario in which the traffic being subject to processing comes from mirroring the traffic exchanged among the cloud workloads (i.e., virtual workloads ((VWLs)). (The technique introduced here applies equally to physical or hybrid networks in which the role of workloads is played by hosts or a constellation of hosts like sub-networks.) In this scenario, taps intercept and mirror (possibly in a selective way) the traffic exchanged by a single workload while an aggregator intercepts the traffic exchanged by a group of workloads (among themselves or with the network hosts outside the group). When the traffic supplied by a group of taps and aggregators gets to a TPF the effect can be interpreted as just receiving a sum of traffic from all traffic interception (i.e., mirroring points). Together, all the traffic processing nodes in the traffic processing network 32 can be interpreted as a distributed traffic processing facility. The processing resources of all the elements of the traffic processing network 32 need to be controlled in a coordinated way in order to achieve the effective optimization of the whole distributed system.

Figure 4:
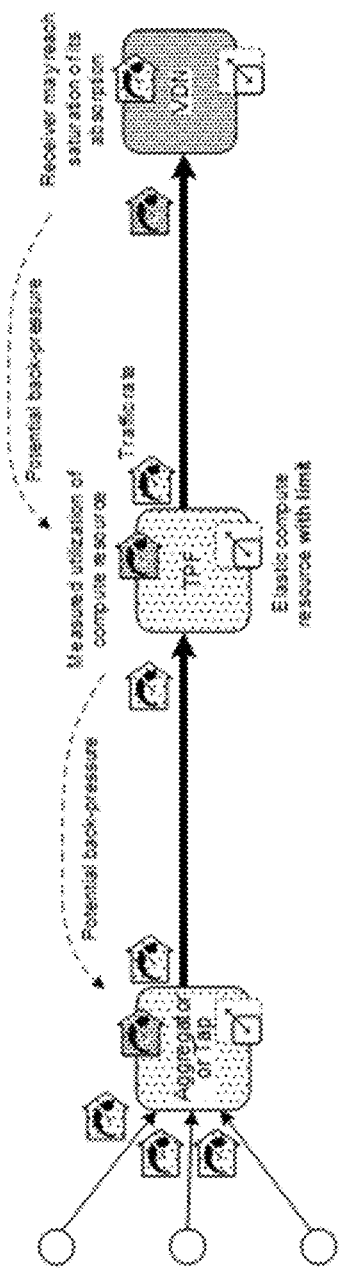
FIG. 4 illustrates an example of a set of chained traffic processing nodes.

One of the issues that need to be taken into consideration when designing such a coordinated resource control is the effect of chaining traffic processing nodes, such as illustrated in FIG. 4. In particular, Figured 4 shows a simplified scenario for the matching of processing load with compute capacity (also traffic rate with bandwidth of inter-node connectivity). The traffic processing elements closer to the destination end of the chain may create a bottleneck for the traffic processing elements closer to the source end of the chain. Hence, it is desirable to accommodate the possible presence of bottlenecks and lower the use of the traffic processing elements located closer to the traffic sources so as not to waste any resources due to potential bottlenecks.

It is best to perform the QoS classification and impose the sampling decisions as part of the traffic processing executed within the taps and aggregators, given that (1) the traffic processing resource control defined in the above-described "Optimal Control of Network Traffic Visibility Resources" uses sampling (for individual QoS classes) as a basis for optimizing the use of resources, and (2) the coordinated control of traffic processing resources is best handled close to the traffic source. Additionally, the TPFs serving as receivers of the traffic supplied by the taps and aggregators are arranged as multiple instances, each instance representing a unit of processing resource, that are subject to some form of load balancing. The load balancing aspect can be therefore combined with the QoS classification and the sampling policy enforcement.

Figure 5:
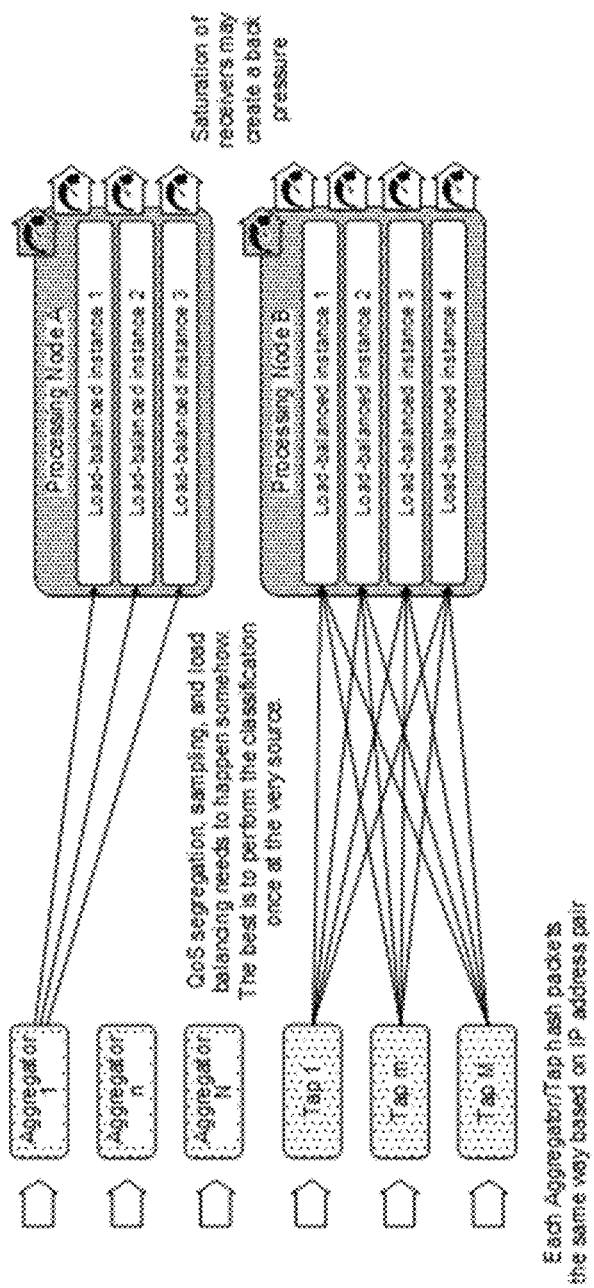
FIG. 5 illustrates an example of how load balancing, QoS classification, and sampling policy enforcement can work in an example scenario that involves the use of IP address pair hashing.

The sampling and load balancing activities are based on some partitioning of the entire traffic universe into a finite number of classes, based on some partitioning criteria, that are used as units of traffic volume. Such units can be grouped either to create samples or sample aggregates intended for a specific destination instance in a load balancing scheme. The definition of such traffic volume units is typically designed to (1) promote integrity of stateful inspection (all packets belonging to the stateful connection belong to the same traffic unit) and (2) promote a quick and efficient classification of packets to a specific unit (e.g. though hashing). A good example of traffic volume unit is a class of packets that represent a specific pair of IP addresses and, therefore, produce the same hash value from the hashing algorithm that uses the IP source and IP destination address fields of a packet. FIG. 5 shows how three activities (load balancing, QoS classification, and sampling policy enforcement) can work in an example scenario that involves the use of IP address pair hashing.

Note that the specific unit of traffic chosen to facilitate a distributed resource control system is not important. The technique introduced here is based on a general way of partitioning the traffic into units that can be used as the bases of sampling and load balancing.

Note also that the taps and aggregators may be subject to elastic resource allocation to support their functions. The tap instances will be typically associated with the workload instances so there is no issue of optimizing the use of resources dedicated to the taps (because as the workload expands into multiple compute resource instances, the tap function instantiation follows.) The aggregators could be arrangements of multiple load balanced instances and be potentially subject to optimal control of resources as defined in the above-described "Optimal Control of Network Traffic Visibility Resources". However, due to the nature of the combination of traffic partitioning into units, sampling, and load balancing, every instance of an aggregator is associated with a set of unique traffic sources. A controller external to the aggregator is assumed always to match the aggregator instance capacity with the traffic processing load related to the traffic sources that feed the aggregator instance. Hence, the aggregators treated as TPFs are assumed not to be subject to the optimal resource control defined in "Optimal Control of Network Traffic Visibility Resources."

Figure 6:
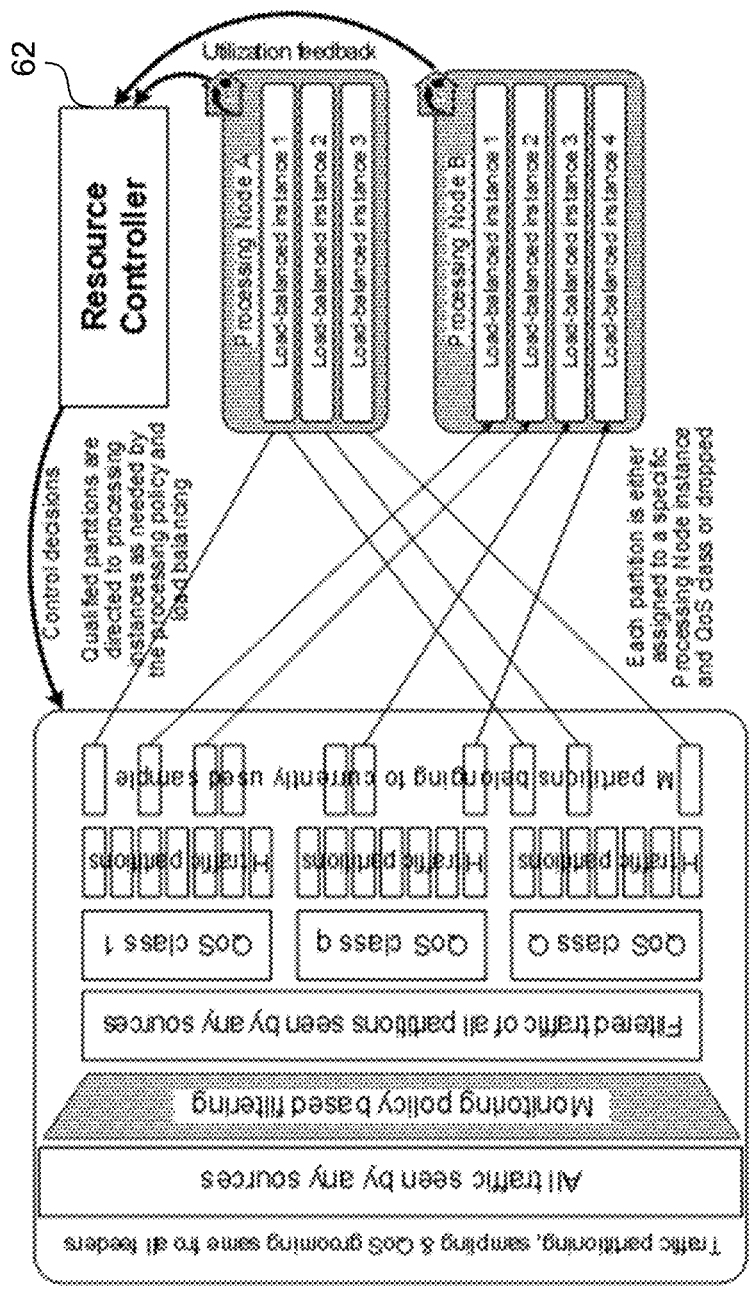
FIG. 6 illustrates an example of how to combine traffic partitioning into traffic volume units, and further illustrates QoS based sampling and load balancing, to achieve optimal control of traffic distribution in a complex multi-node traffic processing system.

FIG. 6 shows an example of how to combine traffic partitioning into traffic volume units, QoS based sampling, and load balancing to achieve optimal control of traffic distribution in a complex multi-node traffic processing system. An assumption in this example is the presence of a resource controller (or simply "controller") 62 that understands the "big picture," i.e., the current sampling needs of any TPFs and the number of instances that are load-balanced in order to implement a given TPF. The resource controller 62 instructs the taps and aggregators how to use the traffic partitioning units, i.e., which of the recognized traffic partitioning units should go to specific TPF instances and which should be just ignored (dropped). The resource controller 62 is discussed further in a section below.

Details of a possible embodiment of this main idea are described below. The following is the summary of certain features of the technique introduced here:

1. A resource controller that instructs the "first contact" traffic handling nodes (i.e., taps and aggregators) of a network traffic visibility system to perform coordinated traffic content partitioning, sampling, and assignment of samples to the destination points participating in the load balancing for the "next step" TPFs (note that a set of taps behave under this mechanism as a distributed traffic aggregator and that there is no difference between how the traffic is treated logically by the taps and the aggregators).

2. Accommodating the TPFs that are subject to an optimal resource control (either maximization of traffic monitoring fidelity within a fixed resource amount or minimizing the resource use for a fixed traffic monitoring fidelity) at the traffic handling points located closest to the source traffic mirroring and therefore accomplishing the optimal control of traffic processing chains in terms of preventing the presence of any bottlenecks in such chains.

3. Performing the classification of traffic to the partition units, selection of units to samples, and assigning selected samples to load-balanced destinations in the most efficient way by doing it just once at the tap/aggregator point (instead of repeating some of the traffic processing steps in the traffic processing facilities).

The technique also can include other elements (described in the next section), such as a method of achieving uniformity of traffic partitioning or a method of achieving the traffic inspection coverage through varying the choice of samples over time.

An alternative for the method presented here is to use dedicated load balancers for resource scalability of traffic processing facilities and perform QoS based sampling separately from the load balancing. That leads to a much less efficient way of accomplishing the combination of sampling and load balancing as many steps involved in the process would be effectively duplicated.

B. Implementation Details

This section describes details of a possible embodiment of the main idea described in the previous section. In particular, we discuss an example traffic volume partitioning method based on the IP pair connections, we discuss the issue of traffic rate uniformity across the universe of traffic partition units, and we discuss examples of how the traffic volume units can be assigned to samples in order to provide sample-based inspection of the entire traffic over a fixed period of time.

Operational Model

Assume that the traffic received by any of the taps and aggregators participating in the traffic processing system is always consistently partitioned into H buckets B(1), B(2), . . . , B(H) based on a hash value derived from the pair of IP addresses present in a packet. The actual hashing algorithm is an implementation detail that is not necessary for understanding the technique introduced here. Typically, the hashing algorithm will "compress" the 64-bit value of IPv4 addresses or 256-bit value of IPv6 addresses into an k-bit number where k is significantly smaller that 64 (perhaps 10, 12, or 16). The number of unique possible hash values in such a case would be H=2 k.

Every time a hashing-based traffic partitioning is used as a basis of sampling or load balancing, the fundamental assumption is that the traffic, over a sufficiently long period of time, tends to be uniformly distributed across the hash buckets, i.e., the counts of packets or bits associated with a particular hash value is statistically similar to such counts for the other possible hash values. (Note that in the scenarios discussed here the uniform distribution is meant for the cumulative traffic coming to all the taps and aggregators involved in the distributed traffic processing system.) This assumption should be always validated by monitoring the traffic from the standpoint of bit/packet counts corresponding to particular hash values. If the validation fails, one needs either to accept an imperfect form of sampling/load-balancing or use a refined form of sampling/load-balancing that takes into account an uneven distribution of traffic across the hash buckets. This topic is further discussed below.

In the scenarios discussed here the notion of traffic distribution uniformity is more complex than it is for the case in which the traffic hash buckets are directly assigned to traffic samples or instances or load-balanced destinations, because:

The originally received traffic may be subject to some form of initial functional filtering by the taps or aggregators before the traffic is considered for sampling or load balancing—such filtering may skew the distribution of the postfiltering traffic across the hash buckets.

The traffic resulting from the initial filtering needs to be sampled and assigned to load-balanced instances of a given traffic processing facility destination in such a way that complies with the sampling ratios across the QoS classes One possible way of arranging the needed per-QoS sampling and assignment of samples to load-balanced destination instances is to:

1. Apply the needed initial functional filtering
2. Divide the outcome of the functional filtering into Q classes according to the QoS class verification criteria
3. For each Q classes, keep verifying the assumption that the bit/packet counts of the traffic belonging to each class and generating a particular hash value is statistically equivalent to the bit/packet counts of the traffic belonging to the same class and generating any other hash value. If the uniformity verification is successful for each of the Q classes then we can apply a very simple way of assigning packets to QoS related samples and to the load-balanced instances of a given traffic processing facility destination:

If the desired sampling ratios (for a specific target traffic processing facility consisting of L load-balanced instances) are $S(1), S(2), \ldots, S(Q)$ then assign $S(q)*H/L$ hash buckets to the traffic of the q-th QoS class $(q=1, 2, \ldots, Q)$ destined for the 1-th load-balanced traffic processing instance $(l=1, 2, \ldots, L)$ The algorithm can be described as involving the establishment of a two-dimensional table indexed by the class index q $(q=1, 2, \ldots, Q)$ and hash index h $(h=1, 2, \ldots, H)$ in which the cells hold a specific load-balanced instance index l $(l=1, 2, \ldots, L)$ or an indicator of no destination assignment (i.e. drop).

Hence, a packet received by any of the taps or aggregators:

undergoes the initial functional filtering;

if qualified, undergoes the classification that produces the index q $(q=1, 2, \ldots, Q)$;

undergoes the generation of a hash value h $(h=1, 2, \ldots, H)$; and gets dropped or sent to the instance l $(l=1, 2, \ldots, L)$ according to the table indexed by q and h.

Choosing specific $S(q)*H$ buckets for each q $(q=1, 2, \ldots, Q)$ is a separate task. The assignment of hash values to particular samples typically can be performed by pseudo-random selection. A given set of hash values assigned to a sample should be:

stable over a short period of time to allow meaningful packet processing of sequences of packets logically belonging to the same connection/session, and variable enough to allow covering the traffic of all hash values to be processed through sampling over a long period of time.

Note that since the fluctuations of traffic rate lead to varying sampling ratios dictated by the resource controller, a given set of hash values in a given sample will be naturally evolving through hash value additions and removals aimed at shaping the sample size appropriately to the needs. To promote good traffic coverage over a long period of time one may consider maintaining the age counter for each possible hash value. Whenever it is time to add a new hash value to a given sample or remove a given value from such a sample, a value with the highest age will be chosen. The age counters get reset whenever a hush value is moved in or out of a sample.

Note that the hash values chosen for various QoS class related samples as well as the hash values assigned to instances of particular traffic processing facilities may be overlapping or non-overlapping over the samples or processing facility instances. In general, because each sample may be of a different size, there is no way to use the same set of hash values across the samples. There may be a benefit of maintaining some alignment of hash values across samples because the traffic processing facilities or the receivers of output from such facilities may want to see a traffic representation that is based on the same (or almost the same) set of IP connections.

If the uniformity verification is not successful across the Q classes, then it is desirable to base the assignment of hash values to samples and load-balanced instances on some form of estimated traffic rate levels associated with individual hash buckets. The use of the two-dimensional table indexed by the class index q $(q=1, 2, \ldots, Q)$ and hash index h $(h=1, 2, \ldots, H)$ can still be used, where the cells of the table hold a specific load-balanced instance index l $(l=1, 2, \ldots, L)$ or an indicator of no destination assignment. What changes is how the cells in this table are established. Rather than having $m=S(q)*H/L$ cells in the h-th column populated with instance indices l $(l=1, 2, \ldots, L)$ we need a more elaborate way of establishing the count m. If $r(q,h)$ is the statistical ratio of packets of the h-th hash bucket $(h=1, 2, \ldots, H)$ that belong to the q-th QoS class $(q=1, 2, \ldots, Q)$ then the set of m buckets feeding a given instance l $(l=1, 2, \ldots, L)$ should satisfy the condition $S(q)=r(q,i(1))+r(q,i(2))+ \ldots +r(q,i(m))$ where $i(1), i(2), \ldots, i(m)$ are indexes of hash values participating in the sample, $(q=1, 2, \ldots, Q)$.

Resource Controller

In general, whenever a set of virtual taps and virtual aggregators of traffic sources feed an arrangement of elastic-resource-with-limit TPFs, there may be a need for a controller entity that:

1) Facilitates the optimal control of resources for all TPFs according to a configured resource control policy (either maximizing the traffic monitoring fidelity within a fixed processing resource or minimizing the use of processing resources for a fixed traffic monitoring fidelity);

2) Coordinates the execution of sampling and load-balancing dispatch activities by the respective virtual taps and virtual aggregators of traffic sources.

The resource controller (e.g., resource controller 62 in FIG. 6) together with the taps and aggregators form a distributed traffic monitoring system that can serve the traffic handling needs of multiple points of delivery (PODs) (a POD is a collection of compute, storage, and network resources that conform to a standard operating footprint that shares the same failure domain.) The resource controller is managed by some entity, such as the customer's Master Orchestrator, which can be, for example, Gigamon Fabric Manager from Gigamon Inc. of Santa Clara, Calif. This entity also configures:

1) the monitoring topology including the taps, aggregators, TPFs, and receivers of output from such facilities;

2) the traffic handling logic of all the TPFs (i.e., the traffic processing graph and the configuration parameters of the graph nodes).

Figure 7:
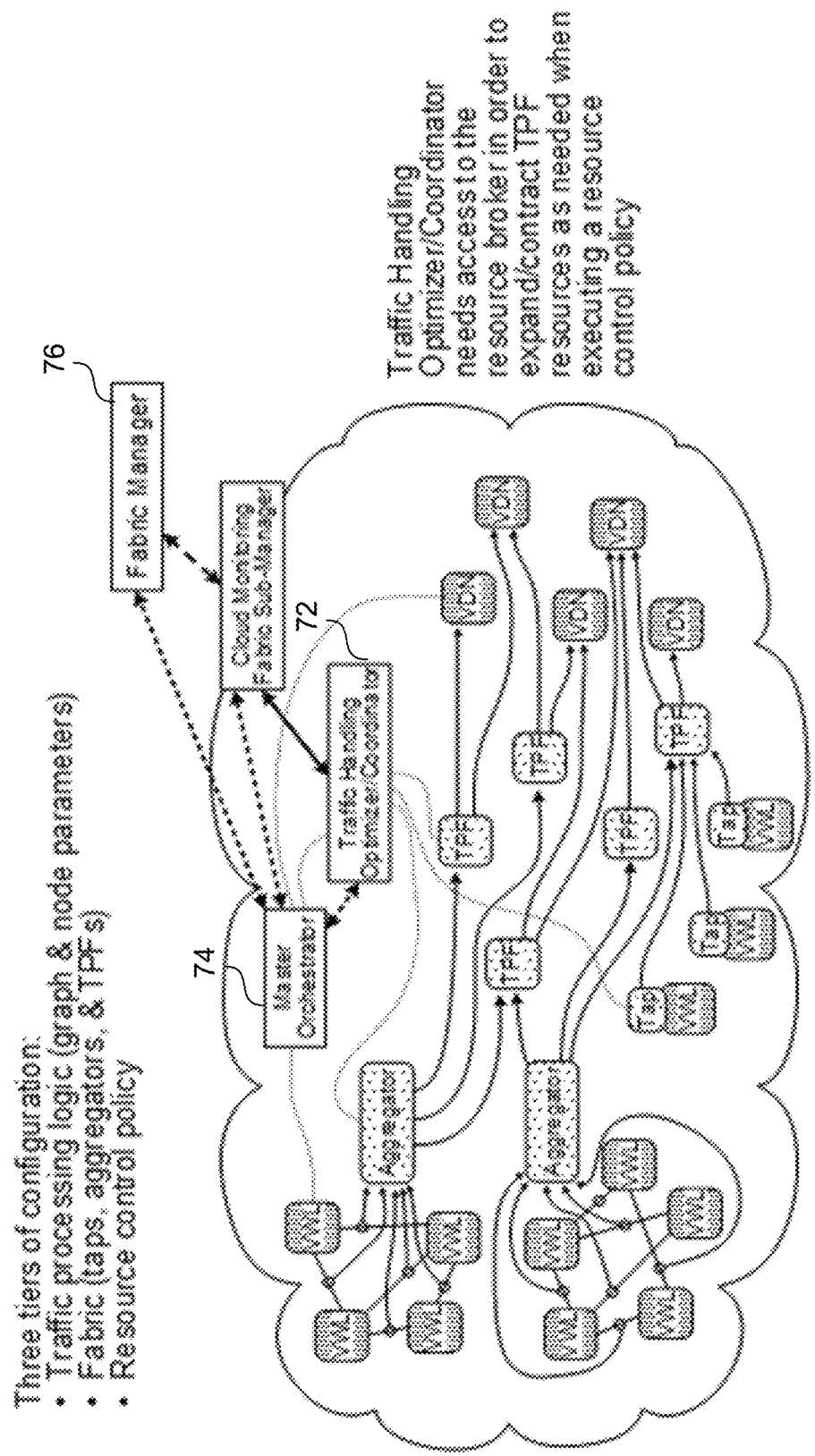
FIG. 7 illustrates examples of possible hierarchies of control in cloud traffic monitoring scenarios.

An example of such a distributed traffic monitoring system is presented in FIG. 7. The resource controller 62 is represented in FIG. 7 as the Traffic Handling Optimizer/Coordinator 72. Note that establishing the resource controller as a separate deployable/executable entity serves at least two purposes:

1) It allows abstracting the strict resource control activities from any other activities involved in establishing and running a distributed traffic processing system; and 2) It promotes scalability through hierarchical control arrangements—in particular, it helps the management entity (such as the Master Orchestrator 74 or the Fabric Manager 76) to remain scalable by delegating the resource control aspect to a number of resource controller instances, each of which coordinates traffic acquisition and processing activities of an arrangement of taps/aggregators/traffic-processing-facilities that represent a subset of such arrangements managed by a central entity.

Figure 8:
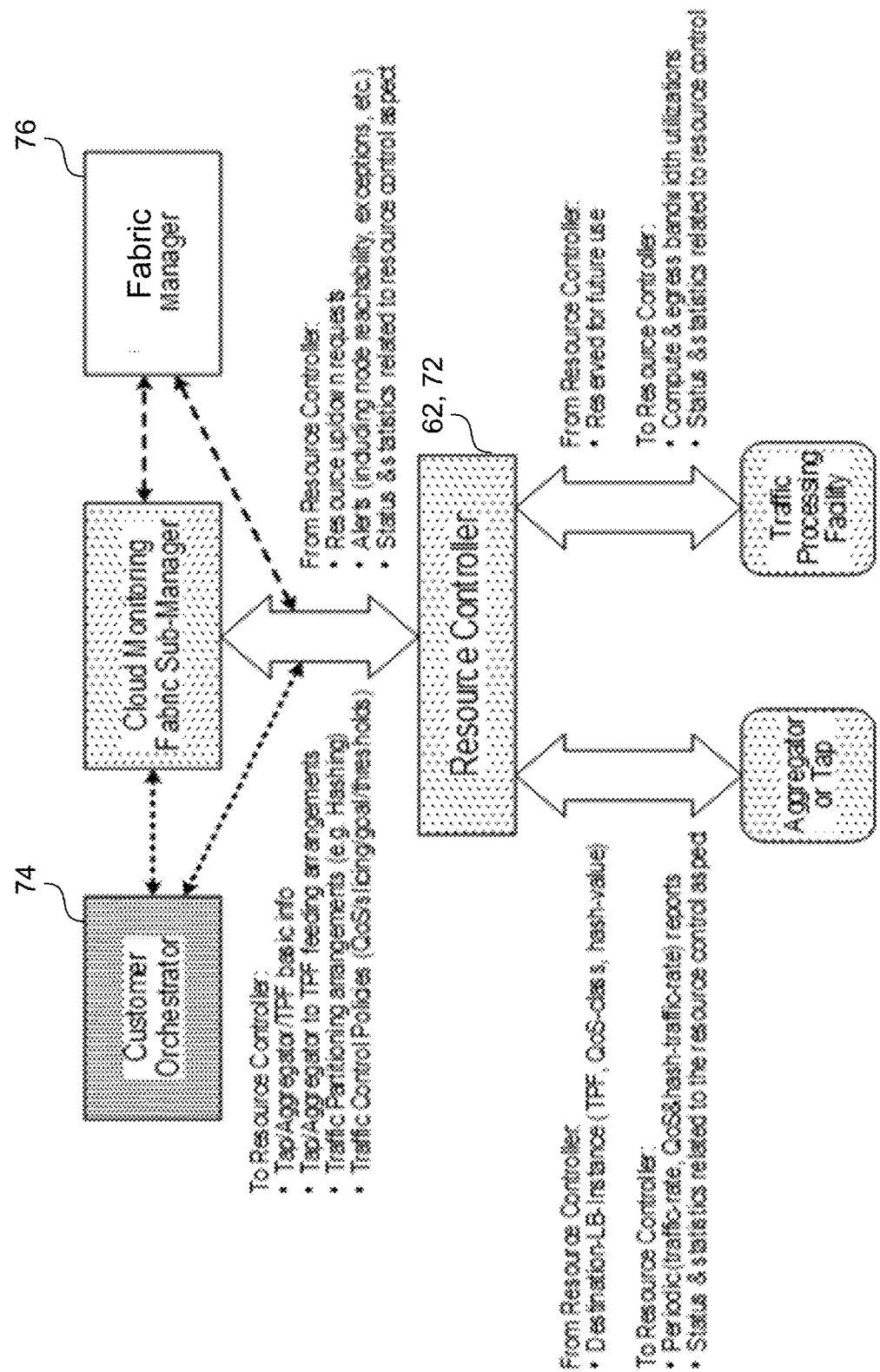
FIG. 8 illustrates an example of a resource controller with examples of its northbound and southbound interfaces.

Note that the resource controller functions and the aspects of taps/aggregators/traffic-processing-facilities that are subject to control may be deliberately kept minimal. For example, the resource controller does not need to know the actual physical nature of the resources, but instead it can operate on abstract resource units and the relative resource utilization indicators (%). It also does not need to know the actual physical nature of the traffic rates or inter-node bandwidth but instead can operate on abstract units of the traffic rate and bandwidth. The important assumption is that the management entities operating above the resource controller provide a proper translation of the abstracted parameters to the actual tangible parameters. FIG. 8 shows an example of the resource controller 62 or 72 with examples of its northbound and southbound interfaces.

Processing System

Figure 9:
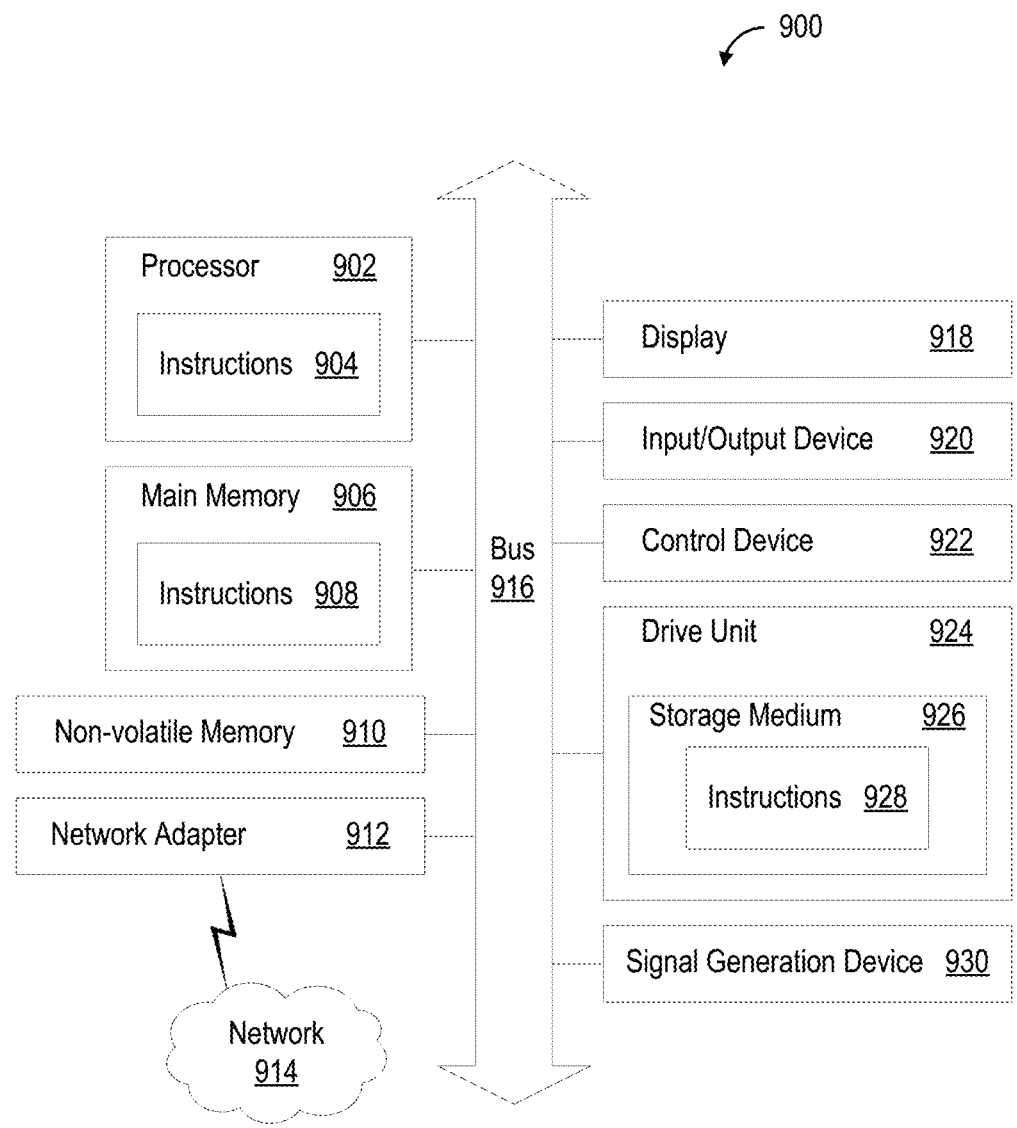
FIG. 9 illustrates an example of a physical processing system in which at least some of the operations described herein can be implemented.

FIG. 9 includes a block diagram illustrating an example of a physical processing system 900 in which at least some of the operations described above can be implemented. For example, the processing system 900 may represent a controller such as controller 10, 62 or 72, or a portion thereof, or a TPF 12 or a portion thereof, or a combination of such devices or portions thereof.

The processing system 900 may include one or more processors 902, main memory 906, non-volatile memory 910, network adapter 912 (e.g., network interfaces), display 918, input/output (I/O) devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 900 operates as a standalone device, although the processing system 900 may be connected (e.g., in a wired manner or wirelessly) to other devices. For example, the processing system 900 may include a terminal that is coupled directly to a network appliance. As another example, the processing system 900 may be wirelessly coupled to the network appliance.

In various embodiments, the processing system 900 may be a server computer, a client computer, a personal computer (PC), a user device, a tablet PC, a laptop or notebook computer, a smartphone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 900.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the processing system 900 and that cause the processing system 900 to perform any one or more of the methodologies of the presently disclosed embodiments.

In general, the routines that are executed to implement the techniques introduced above may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 910, floppy and other removable disks, hard disk drives, flash drives, so-called thumb drives (e.g., USB memory sticks), optical disks, and transmission type media such as digital and analog communication links.

The network adapter 912 enables the processing system 900 to receive and transmit data over a network 914 with one or more entities external to the processing system 900, through any known and/or convenient communications protocol. The network adapter 912 can include one or more of a network adaptor card, a wireless transceiver, a router (wired or wireless), an access point, a switch, a protocol converter, a gateway, a bridge, bridge router, a hub, a digital media receiver, and/or a repeater.

The techniques introduced above may implemented by, for example, programmable circuitry (e.g., one or more microprocessors), programmed with software and/or firmware, or entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

EXAMPLES OF CERTAIN EMBODIMENTS

Certain embodiments of the technology introduced herein are summarized in the following numbered examples:
1. A controller for use with a network traffic visibility system, the controller comprising:
 a network interface through which to receive information indicative of operation of the network traffic visibility system;
 a memory; and
 at least one processor coupled to the memory and the network interface and configured to facilitate control of resources in the network traffic visibility system, according to a configured resource control policy, by
  providing, during a first time period, control signaling to cause maximization of network traffic monitoring fidelity for a plurality of quality of service (QoS) classes of network traffic, for a specified fixed amount of utilization of one or more network resources, and
  providing, during a second time period, control signaling to cause minimization of use of the one or more network resources, for a specified fixed level of traffic monitoring fidelity associated with the plurality of QoS classes.
2. A controller as recited in example 1, wherein the network traffic monitoring fidelity for the plurality of QoS classes comprises an aggregated measure of sampling ratios for the plurality of QoS classes.
3. A controller as recited in example 1 or example 2, wherein the at least one processor is configured to facilitate control of resources in the network traffic visibility system by:
 providing control signaling to cause maximization of network traffic monitoring fidelity for the plurality of QoS classes of network traffic, for the specified fixed amount of the one or more network resources, while an amount of utilization of the one or more network resources is outside a specified range; and
 providing control signaling to cause minimization of use of the one or more network resources, for the specified fixed level of traffic monitoring fidelity, while the amount of utilization of the one or more network resources is within the specified range.
4. A controller as recited in example 3, wherein the specified range comprises an upper threshold and a lower threshold.
5. A controller as recited in any of examples 1 through 4, wherein maximization of network traffic monitoring fidelity for the plurality of QoS classes comprises maximization of an aggregated measure of sampling ratios for the plurality of QoS classes.
6. A controller as recited in any of examples 1 through 5, wherein the at least one processor is further configured to coordinate execution of sampling and load-balancing dispatch activities by the respective virtual taps and virtual aggregators of traffic sources.
7. A controller as recited in any of examples 1 through 6, wherein the at least one processor is further configured to perform:
 collecting network traffic statistics and resource utilization statistics associated with the network traffic visibility system;
 generating, based on the collected statistics, estimates of relationships between traffic rate changes and corresponding resource utilization changes for the network traffic visibility system; and
 using the estimates to adjust sampling ratios of the plurality of QoS classes as part of said facilitating control.
8. A controller as recited in any of examples 1 through 7, wherein the at least one processor is further configured to perform:
 defining a plurality of hash buckets for network traffic input to the network traffic visibility system;
 assigning portions of the network traffic input to the network traffic visibility system to individual ones of the plurality of hash buckets; and
 load balancing the portions of the network traffic, within the network traffic visibility system, based on the hash buckets to which the portions of the network traffic are assigned.
9. A controller as recited in example 8, wherein the hash buckets are based on pairs of source and destination addresses of the portions of the network traffic.
10. A controller as recited in any of examples 1 through 9, wherein the network visibility system receives the network traffic from a plurality of traffic sources, wherein the at least one processor is further configured to perform:
 identifying a first set of resources of the network traffic visibility system and a second set of resources of the network traffic visibility system; and in response to a determination that the first set of resources are logically closer to the traffic sources than the second set of resources, giving higher priority to causing minimization of use of the first set of resources than to causing minimization of use of the second set of resources.

11. A method of optimizing network traffic visibility resources, the method comprising:

receiving, by a controller associated with a network traffic visibility system, information indicative of operation of the network traffic visibility system;

facilitating, by the controller, control of resources in the network traffic visibility system, according to a configured resource control policy, by performing at least one of:

providing, by the controller, control signaling to cause maximization of network traffic monitoring fidelity for a plurality of Quality of Service (QoS) classes of network traffic, based on a specified fixed amount of one or more network resources associated with the network traffic visibility system, or providing, by the controller, control signaling to cause minimization of use of the one or more network resources, based on a specified fixed level of traffic monitoring fidelity associated with the plurality of QoS classes.

12. A method as recited in example 11, wherein maximization of the network traffic monitoring fidelity for the plurality of QoS classes comprises maximization of an aggregated measure of sampling ratios for the plurality of QoS classes.

13. A method as recited in example 11 or example 12, wherein said facilitating comprises:

providing, by the controller, control signaling to cause maximization of network traffic monitoring fidelity for the plurality of QoS classes of network traffic, based on a specified fixed amount of the one or more network resources, and providing, by the controller, control signaling to cause minimization of use of the one or more network resources, based on a specified fixed level of traffic monitoring fidelity associated with the plurality of QoS classes.

14. A method as recited in any of examples 11 through 13, wherein said facilitating comprises:

providing, by the controller, control signaling to cause maximization of network traffic monitoring fidelity for the plurality of QoS classes of network traffic, for the specified fixed amount of the one or more network resources, while an amount of the one or more network resources is outside a specified range; and providing, by the controller, control signaling to cause minimization of use of the one or more network resources, for the specified fixed level of traffic monitoring fidelity, while the amount of the one or more network resources is within the specified range.

15. A method as recited in example 14, wherein the specified range comprises an upper threshold and a lower threshold.

16. A method as recited in any of examples 11 through 15, further comprising:

coordinating execution of sampling and load-balancing dispatch activities by the respective virtual taps and virtual aggregators of traffic sources.

17. A method as recited in any of examples 11 through 16, further comprising:

collecting network traffic statistics and resource utilization statistics associated with the network traffic visibility system;

generating, based on the collected statistics, estimates of relationships between traffic rate changes and corresponding resource utilization changes for the network traffic visibility system; and using the estimates to adjust sampling ratios of the plurality of QoS classes as part of said facilitating control.

18. A method as recited in any of examples 11 through 17, further comprising:

defining a plurality of hash buckets for network traffic input to the network traffic visibility system;

assigning portions of the network traffic input to the network traffic visibility system to individual ones of the plurality of hash buckets; and load balancing the portions of the network traffic, within the network traffic visibility system, based on the hash buckets to which the portions of the network traffic are assigned.

19. A method as recited in example 18, wherein the hash buckets are based on pairs of source and destination addresses of the portions of the network traffic.

20. A method as recited in any of examples 11 through 19, wherein the network visibility system receives the network traffic from a plurality of traffic sources, the method further comprising:

identifying a first set of resources of the network traffic visibility system and a second set of resources of the network traffic visibility system; and in response to a determination that the first set of resources are logically closer to the traffic sources than the second set of resources, giving higher priority to causing minimization of use of the first set of resources than to causing minimization of use of the second set of resources.

21. At least one non-transitory machine-readable medium storing instructions, execution of which by a controller associated with a network traffic visibility system causes the controller to perform operations comprising:

providing control signaling to cause maximization of network traffic monitoring fidelity for a plurality of quality of service (QoS) classes of network traffic, for a specified fixed amount of utilization of one or more network resources associated with the network traffic visibility system, and providing control signaling to cause minimization of use of the one or more network resources, for a specified fixed level of traffic monitoring fidelity associated with the plurality of QoS classes.

22. At least one non-transitory machine-readable medium as recited in example 21, wherein maximization of network traffic monitoring fidelity for the plurality of QoS classes comprises maximization of an aggregated measure of sampling ratios for the plurality of QoS classes.

23. At least one non-transitory machine-readable medium as recited in example 21 or example 22, said operations further comprising:

providing control signaling to cause maximization of network traffic monitoring fidelity for the plurality of QoS classes of network traffic, for the specified fixed amount of the one or more network resources, while an amount of utilization of the one or more network resources is outside a specified range; and providing control signaling to cause minimization of use of the one or more network resources, for the specified fixed level of traffic monitoring fidelity, while the amount of utilization of the one or more network resources is within the specified range.

24. At least one non-transitory machine-readable medium as recited in example 23, wherein the specified range comprises an upper threshold and a lower threshold.

25. At least one non-transitory machine-readable medium as recited in any of examples 21 through 24, wherein the at least one processor is further configured to coordinate execution of sampling and load-balancing dispatch activities by the respective virtual taps and virtual aggregators of traffic sources.

26. At least one non-transitory machine-readable medium as recited in any of examples 21 through 2\5, said operations further comprising:
collecting network traffic statistics and resource utilization statistics associated with the network traffic visibility system;
generating, based on the collected statistics, estimates of relationships between traffic rate changes and corresponding resource utilization changes for the network traffic visibility system; and
using the estimates to adjust sampling ratios of the plurality of QoS classes as part of said facilitating control.

27. At least one non-transitory machine-readable medium as recited in any of examples 21 through 26, said operations further comprising:
defining a plurality of hash buckets for network traffic input to the network traffic visibility system;
assigning portions of the network traffic input to the network traffic visibility system to individual ones of the plurality of hash buckets; and
load balancing the portions of the network traffic, within the network traffic visibility system, based on the hash buckets to which the portions of the network traffic are assigned.

28. At least one non-transitory machine-readable medium as recited in example 27, wherein the hash buckets are based on pairs of source and destination addresses of the portions of the network traffic.

29. At least one non-transitory machine-readable medium as recited in any of examples 21 through 28, wherein the network visibility system receives the network traffic from a plurality of traffic sources, said operations further comprising:
identifying a first set of resources of the network traffic visibility system and a second set of resources of the network traffic visibility system; and
in response to a determination that the first set of resources are logically closer to the traffic sources than the second set of resources, giving higher priority to causing minimization of use of the first set of resources than to causing minimization of use of the second set of resources.

30. An apparatus for optimizing network traffic visibility resources, the apparatus comprising:
means for receiving information indicative of operation of the network traffic visibility system;
means for facilitating control of resources in the network traffic visibility system, according to a configured resource control policy, including at least one of:
means for providing control signaling to cause maximization of network traffic monitoring fidelity for a plurality of Quality of Service (QoS) classes of network traffic, based on a specified fixed amount of one or more network resources associated with the network traffic visibility system, or
means for providing control signaling to cause minimization of use of the one or more network resources, based on a specified fixed level of traffic monitoring fidelity associated with the plurality of QoS classes.

31. An apparatus as recited in example 30, wherein maximization of the network traffic monitoring fidelity for the plurality of QoS classes comprises maximization of an aggregated measure of sampling ratios for the plurality of QoS classes.

32. An apparatus as recited in example 30 or example 31, wherein said means for facilitating comprises:
means for providing control signaling to cause maximization of network traffic monitoring fidelity for the plurality of QoS classes of network traffic, based on a specified fixed amount of the one or more network resources, and
means for providing control signaling to cause minimization of use of the one or more network resources, based on a specified fixed level of traffic monitoring fidelity associated with the plurality of QoS classes.

33. An apparatus as recited in any of examples 30 through 33, wherein said means for facilitating comprises:
means for providing control signaling to cause maximization of network traffic monitoring fidelity for the plurality of QoS classes of network traffic, for the specified fixed amount of the one or more network resources, while an amount of the one or more network resources is outside a specified range; and
means for providing control signaling to cause minimization of use of the one or more network resources, for the specified fixed level of traffic monitoring fidelity, while the amount of the one or more network resources is within the specified range.

34. An apparatus as recited in example 33, wherein the specified range comprises an upper threshold and a lower threshold.

35. An apparatus as recited in any of examples 30 through 34, further comprising:
means for coordinating execution of sampling and load-balancing dispatch activities by the respective virtual taps and virtual aggregators of traffic sources.

36. An apparatus as recited in any of examples 30 through 35, further comprising:
means for collecting network traffic statistics and resource utilization statistics associated with the network traffic visibility system;
means for generating, based on the collected statistics, estimates of relationships between traffic rate changes and corresponding resource utilization changes for the network traffic visibility system; and
means for using the estimates to adjust sampling ratios of the plurality of QoS classes as part of said facilitating control.

37. An apparatus as recited in any of examples 30 through 36, further comprising:
means for defining a plurality of hash buckets for network traffic input to the network traffic visibility system;
means for assigning portions of the network traffic input to the network traffic visibility system to individual ones of the plurality of hash buckets; and
means for load balancing the portions of the network traffic, within the network traffic visibility system, based on the hash buckets to which the portions of the network traffic are assigned.

38. An apparatus as recited in example 37, wherein the hash buckets are based on pairs of source and destination addresses of the portions of the network traffic.

39. An apparatus as recited in any of examples 30 through 39, wherein the network visibility system receives the network traffic from a plurality of traffic sources, the apparatus further comprising:
means for identifying a first set of resources of the network traffic visibility system and a second set of resources of the network traffic visibility system; and means for in response to a determination that the first set of resources are logically closer to the traffic sources than the second set of resources, giving higher priority to causing minimization of use of the first set of resources than to causing minimization of use of the second set of resources.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A controller for use with a network traffic visibility system, the controller comprising:
    a network interface through which to receive information indicative of operation of the network traffic visibility system;
    a memory; and
    at least one processor coupled to the memory and the network interface and configured to facilitate control of resources in the network traffic visibility system, according to a configured resource control policy, by
        providing, during a first time period, control signaling to cause maximization of network traffic monitoring fidelity for a plurality of quality of service (QoS) classes of network traffic, for a specified fixed amount of utilization of one or more network resources,
        providing, during a second time period, control signaling to cause minimization of use of the one or more network resources, for a specified fixed level of traffic monitoring fidelity associated with the plurality of QoS classes;
        defining a plurality of hash buckets for network traffic input to the network traffic visibility system;
        assigning portions of the network traffic input to the network traffic visibility system to individual ones of the plurality of hash buckets; and
        load balancing the portions of the network traffic, within the network traffic visibility system, based on the hash buckets to which the portions of the network traffic are assigned.

2. The controller of claim 1, wherein the network traffic monitoring fidelity for the plurality of QoS classes comprises an aggregated measure of sampling ratios for the plurality of QoS classes.

3. The controller of claim 1, wherein the at least one processor is configured to facilitate control of resources in the network traffic visibility system by:
    providing control signaling to cause maximization of network traffic monitoring fidelity for the plurality of QoS classes of network traffic, for the specified fixed amount of the one or more network resources, while an amount of utilization of the one or more network resources is outside a specified range; and
    providing control signaling to cause minimization of use of the one or more network resources, for the specified fixed level of traffic monitoring fidelity, while the amount of utilization of the one or more network resources is within the specified range.

4. The controller of claim 3, wherein the specified range comprises an upper threshold and a lower threshold.

5. The controller of claim 1, wherein maximization of network traffic monitoring fidelity for the plurality of QoS classes comprises maximization of an aggregated measure of sampling ratios for the plurality of QoS classes.

6. The controller of claim 1, wherein the at least one processor is further configured to coordinate execution of sampling and load-balancing dispatch activities by respective virtual taps and virtual aggregators of traffic sources.

7. The controller of claim 1, wherein the at least one processor is further configured to perform:
    collecting network traffic statistics and resource utilization statistics associated with the network traffic visibility system;
    generating, based on the collected statistics, estimates of relationships between traffic rate changes and corresponding resource utilization changes for the network traffic visibility system; and
    using the estimates to adjust sampling ratios of the plurality of QoS classes as part of said facilitating control.

8. The controller of claim 1, wherein the hash buckets are based on pairs of source and destination addresses of the portions of the network traffic.

9. A controller for use with a network traffic visibility system, the controller comprising:
    a network interface through which to receive information indicative of operation of the network traffic visibility system;
    a memory; and
    at least one processor coupled to the memory and the network interface and configured to facilitate control of resources in the network traffic visibility system, according to a configured resource control policy, by
        providing, during a first time period, control signaling to cause maximization of network traffic monitoring fidelity for a plurality of quality of service (QoS) classes of network traffic, for a specified fixed amount of utilization of one or more network resources,
        providing, during a second time period, control signaling to cause minimization of use of the one or more network resources, for a specified fixed level of traffic monitoring fidelity associated with the plurality of QoS classes;
    wherein the network visibility system receives the network traffic from a plurality of traffic sources, wherein the at least one processor is further configured to perform:
    identifying a first set of resources of the network traffic visibility system and a second set of resources of the network traffic visibility system; and
    in response to a determination that the first set of resources are logically closer to the traffic sources than the second set of resources, giving higher priority to causing minimization of use of the first set of resources than to causing minimization of use of the second set of resources.

10. A method of optimizing network traffic visibility resources, the method comprising:
    receiving, by a controller associated with a network traffic visibility system, information indicative of operation of the network traffic visibility system;
    facilitating, by the controller, control of resources in the network traffic visibility system, according to a configured resource control policy, by performing at least one of:
        providing, by the controller, control signaling to cause maximization of network traffic monitoring fidelity for a plurality of Quality of Service (QoS) classes of network traffic, based on a specified fixed amount of one or more network resources associated with the network traffic visibility system, or
        providing, by the controller, control signaling to cause minimization of use of the one or more network resources, based on a specified fixed level of traffic monitoring fidelity associated with the plurality of QoS classes;
    wherein the network visibility system receives the network traffic from a plurality of traffic sources, the method further comprising:
    identifying a first set of resources of the network traffic visibility system and a second set of resources of the network traffic visibility system; and
    in response to a determination that the first set of resources are logically closer to the traffic sources than the second set of resources, giving higher priority to causing minimization of use of the first set of resources than to causing minimization of use of the second set of resources.

11. The method of claim 10, wherein maximization of the network traffic monitoring fidelity for the plurality of QoS classes comprises maximization of an aggregated measure of sampling ratios for the plurality of QoS classes.

12. The method of claim 10, wherein said facilitating comprises:
    providing, by the controller, control signaling to cause maximization of network traffic monitoring fidelity for the plurality of QoS classes of network traffic, based on a specified fixed amount of the one or more network resources, and
    providing, by the controller, control signaling to cause minimization of use of the one or more network resources, based on a specified fixed level of traffic monitoring fidelity associated with the plurality of QoS classes.

13. The method of claim 12, wherein said facilitating comprises:
    providing, by the controller, control signaling to cause maximization of network traffic monitoring fidelity for the plurality of QoS classes of network traffic, for the specified fixed amount of the one or more network resources, while an amount of the one or more network resources is outside a specified range; and
    providing, by the controller, control signaling to cause minimization of use of the one or more network resources, for the specified fixed level of traffic monitoring fidelity, while the amount of the one or more network resources is within the specified range.

14. The method of claim 13, wherein the specified range comprises an upper threshold and a lower threshold.

15. The method of claim 10, further comprising:
    coordinating execution of sampling and load-balancing dispatch activities by respective virtual taps and virtual aggregators of traffic sources.

16. The method of claim 10, further comprising:
    collecting network traffic statistics and resource utilization statistics associated with the network traffic visibility system;
    generating, based on the collected statistics, estimates of relationships between traffic rate changes and corresponding resource utilization changes for the network traffic visibility system; and
    using the estimates to adjust sampling ratios of the plurality of QoS classes as part of said facilitating control.

17. A method of optimizing network traffic visibility resources, the method comprising:
    receiving, by a controller associated with a network traffic visibility system, information indicative of operation of the network traffic visibility system;
    facilitating, by the controller, control of resources in the network traffic visibility system, according to a configured resource control policy, by performing at least one of:
        providing, by the controller, control signaling to cause maximization of network traffic monitoring fidelity for a plurality of Quality of Service (QoS) classes of network traffic, based on a specified fixed amount of one or more network resources associated with the network traffic visibility system, or
        providing, by the controller, control signaling to cause minimization of use of the one or more network resources, based on a specified fixed level of traffic monitoring fidelity associated with the plurality of QoS classes;
    defining a plurality of hash buckets for network traffic input to the network traffic visibility system;
    assigning portions of the network traffic input to the network traffic visibility system to individual ones of the plurality of hash buckets; and
    load balancing the portions of the network traffic, within the network traffic visibility system, based on the hash buckets to which the portions of the network traffic are assigned.

18. The method of claim 17, wherein the hash buckets are based on pairs of source and destination addresses of the portions of the network traffic.

19. At least one non-transitory machine-readable medium storing instructions, execution of which by a controller associated with a network traffic visibility system causes the controller to perform operations comprising:
    providing control signaling to cause maximization of network traffic monitoring fidelity for a plurality of quality of service (QoS) classes of network traffic, for a specified fixed amount of utilization of one or more network resources associated with the network traffic visibility system, and
    providing control signaling to cause minimization of use of the one or more network resources, for a specified fixed level of traffic monitoring fidelity associated with the plurality of QoS classes;
    defining a plurality of hash buckets for network traffic input to the network traffic visibility system;
    assigning portions of the network traffic input to the network traffic visibility system to individual ones of the plurality of hash buckets; and
    load balancing the portions of the network traffic, within the network traffic visibility system, based on the hash buckets to which the portions of the network traffic are assigned.

20. The at least one non-transitory machine-readable medium of claim 19, wherein maximization of network traffic monitoring fidelity for the plurality of QoS classes comprises maximization of an aggregated measure of sampling ratios for the plurality of QoS classes.

21. The at least one non-transitory machine-readable medium of claim 19, said operations further comprising:
providing control signaling to cause maximization of network traffic monitoring fidelity for the plurality of QoS classes of network traffic, for the specified fixed amount of the one or more network resources, while an amount of utilization of the one or more network resources is outside a specified range; and
providing control signaling to cause minimization of use of the one or more network resources, for the specified fixed level of traffic monitoring fidelity, while the amount of utilization of the one or more network resources is within the specified range.

22. The at least one non-transitory machine-readable medium of claim 21, wherein the specified range comprises an upper threshold and a lower threshold.

23. The at least one non-transitory machine-readable medium of claim 19, said operations further comprising:
coordinating execution of sampling and load-balancing dispatch activities by respective virtual taps and virtual aggregators of traffic sources.

24. The at least one non-transitory machine-readable medium of claim 19, said operations further comprising:
collecting network traffic statistics and resource utilization statistics associated with the network traffic visibility system;
generating, based on the collected statistics, estimates of relationships between traffic rate changes and corresponding resource utilization changes for the network traffic visibility system; and
using the estimates to adjust sampling ratios of the plurality of QoS classes as part of said facilitating control.

25. The at least one non-transitory machine-readable medium of claim 19, wherein the hash buckets are based on pairs of source and destination addresses of the portions of the network traffic.

26. At least one non-transitory machine-readable medium storing instructions, execution of which by a controller associated with a network traffic visibility system causes the controller to perform operations comprising:
providing control signaling to cause maximization of network traffic monitoring fidelity for a plurality of quality of service (QoS) classes of network traffic, for a specified fixed amount of utilization of one or more network resources associated with the network traffic visibility system, and
providing control signaling to cause minimization of use of the one or more network resources, for a specified fixed level of traffic monitoring fidelity associated with the plurality of QoS classes;
wherein the network visibility system receives the network traffic from a plurality of traffic sources, said operations further comprising:
identifying a first set of resources of the network traffic visibility system and a second set of resources of the network traffic visibility system; and
in response to a determination that the first set of resources are logically closer to the traffic sources than the second set of resources, giving higher priority to causing minimization of use of the first set of resources than to causing minimization of use of the second set of resources.

* * * * *